(12) United States Patent
Finke-Anlauff et al.

(10) Patent No.: US 7,397,658 B2
(45) Date of Patent: Jul. 8, 2008

(54) MULTI-FUNCTION ELECTRONIC DEVICE WITH SPLIT COVER

(75) Inventors: Andrea Finke-Anlauff, Braunschweig (DE); Torsten Günther, Braunschweig (DE); Lutz Cordes, Hannover (DE)

(73) Assignee: Nokia Corporation, Espoo (FI)

( * ) Notice: Subject to any disclaimer, the term of this patent is extended or adjusted under 35 U.S.C. 154(b) by 441 days.

(21) Appl. No.: 11/136,133

(22) Filed: May 24, 2005

(65) Prior Publication Data

US 2006/0268498 A1 Nov. 30, 2006

(51) Int. Cl.
*G06F 1/16* (2006.01)
(52) U.S. Cl. ............ 361/683; 400/489; 400/718; 455/575.1; 455/566; 345/168
(58) Field of Classification Search ......... 361/680–683; 400/489, 718; 455/575.1, 566; 345/168, 345/169
See application file for complete search history.

(56) References Cited

U.S. PATENT DOCUMENTS

| 5,502,460 | A | * | 3/1996 | Bowen | 345/168 |
| 5,644,338 | A | * | 7/1997 | Bowen | 345/168 |
| 6,111,527 | A | * | 8/2000 | Susel | 341/22 |
| 6,151,012 | A | * | 11/2000 | Bullister | 345/168 |
| 6,697,055 | B1 | * | 2/2004 | Bullister | 345/168 |
| 6,785,126 | B2 | * | 8/2004 | Hazzard et al. | 361/680 |
| 6,914,776 | B2 | * | 7/2005 | Kim | 361/683 |
| 2003/0103041 | A1 | * | 6/2003 | Nguyen et al. | 345/168 |
| 2004/0164965 | A1 | * | 8/2004 | Bullister | 345/168 |
| 2005/0020323 | A1 | | 1/2005 | Kim | |
| 2005/0078443 | A1 | | 4/2005 | Lee et al. | |

FOREIGN PATENT DOCUMENTS

| EP | 1 528 758 A | 5/2005 |
| WO | WO 03/049077 A | 6/2003 |

* cited by examiner

*Primary Examiner*—Lisa Lea-Edmonds
(74) *Attorney, Agent, or Firm*—Perman & Green, LLP

(57) ABSTRACT

In a multi-function electronic device, consists of a display mounted on the device and a two part cover with each cover part slidable on the device in opposite directions for covering and exposing the display. The two part cover is equipped with a full function keyboard.

9 Claims, 3 Drawing Sheets

MULTI-FUNCTION ELECTRONIC DEVICE WITH SPLIT COVER

BACKGROUND OF THE INVENTION

1. Field of the Invention

The subject matter of this application relates to an arrangement of components that combines the functions of a multi-use electronic device to optimize their usefulness. More specifically, this application describes an electronic device having a display and a two part cover with each part slidable on the device in opposite directions for covering the display. The two part cover is equipped with a split full function keyboard.

2. Brief Description of Related Developments

Mobile telephones and similar communication devices now provide a multitude of services, such as, Internet access, personal information management, facsimile, text messaging, picture, video, radio, in addition to telephone communication. This requires an arrangement of the components in a package that allows the efficient and ergonomically convenient use of the various functions.

With the introduction of such multi-function electronic devices, it has become increasingly more difficult to design a user interface that enables the user to access the many types of functions and applications available in small hand held devices. It is a particular challenge to present a simple and efficient means by which the user can communicate with the device for browsing, selecting, and operating amidst the wide array of functional choices. The user interface generally consists of a keypad for entering data and commands and a display screen for presenting information relating to operation of the selected function. The keypad and display are in continuous competition for space on the device, as it is desirable that each be as large as possible for ease of use and viewing. This is particularly difficult when it is advantageous to provide a full function keyboard, for example, a QWERTY style keyboard.

It is a purpose of this invention to use a slidable cover which is split in two to cover and expose the display panel, wherein a keyboard is mounted on the cover to maximize the allotment of space to a display and a keyboard.

SUMMARY OF THE INVENTION

A multi-function electronic device, such as a combination PDA/cellular telephone is designed to provide a wide variety of functions including, at least, a personal digital assistant, and a cellular telephone. The device consists of a body and a cover. The cover is constructed in two parts, with each part sliding in opposite directions on the body from an open position in which the parts are separated to a closed position in which the parts are together.

The body portion is constructed as a housing that encloses the components of the device in various known configurations to provide a wide variety of functions and applications. These components may include, for example a microprocessor, mobile telephone transceiver, PDA, camera, display driver firmware, display memory and other processor components depending on the features offered to the user.

In accordance with one aspect of the invention, a display screen is arranged on the top surface of the body and the substantially rectangular shape of the display extends over a majority of the area of the top surface. The two parts of the split cover are slidable over the display to protect the display in a closed mode of operation. The split cover panel is constructed with a transparent window to allow at least a portion of the display screen to be visible in the closed position. A keyboard is constructed in two portions, each mounted on respective parts of the split covers for operation in association with the full display screen or the visible portion of the display screen, depending on the relative position of the parts of the covers. The microprocessor controller adapts the display screen in correlation with the cover positions.

In accordance with an aspect of the invention, the body of the device has a longitudinal axis and the sliding motion of the cover parts on the body is parallel to the longitudinal axis. In another aspect of the invention, the sliding motion of the cover parts is transverse to the longitudinal axis.

In accordance with another aspect of the invention the keyboard contains a full QWERTY array of keys and the array is arranged in alignment with the length of the device to maximize its size. In this embodiment the array of keys is operable only in the closed position.

In accordance with another aspect of the invention the display screen is touch sensitive.

BRIEF DESCRIPTION OF THE DRAWINGS

The device of this invention is explained in more detail below with reference to the accompanying drawing, in which.

DESCRIPTION OF THE PREFERRED EMBODIMENT

Figure 1:
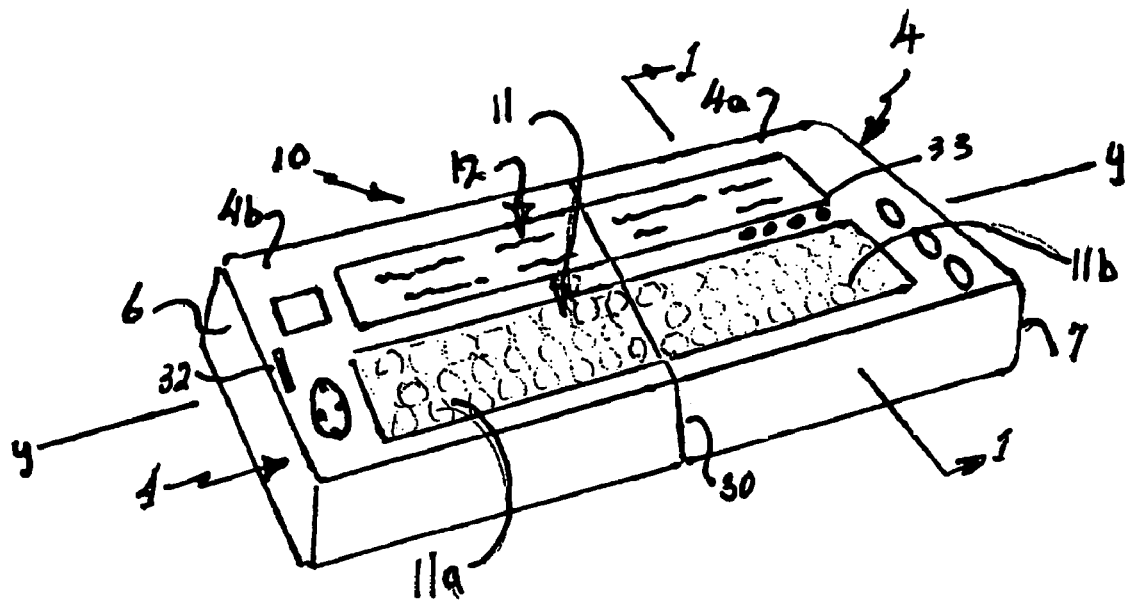
FIG. 1 is a perspective view of an embodiment of a multi-function device with the cover panel in a closed position.

A multifunctional device 10, for example, a combination PDA and cellular telephone, incorporating features of the present invention is illustrated in the figures. Although the present invention will be described with reference to the embodiments shown in the drawings, it should be understood that the present invention may have many alternate forms. In addition, any suitable size, shape or type of elements or materials could be used.

Multi-function electronic device 10, may be designed to provide a wide variety of functions including, personal digital assistant, Internet access, cellular telephone, digital camera, clock, radio, and others. For the purposes of describing the subject invention, only the PDA and cellular functions are discussed, but it is intended that the arrangement described herein may be used with many other functions and services.

Figure 2:
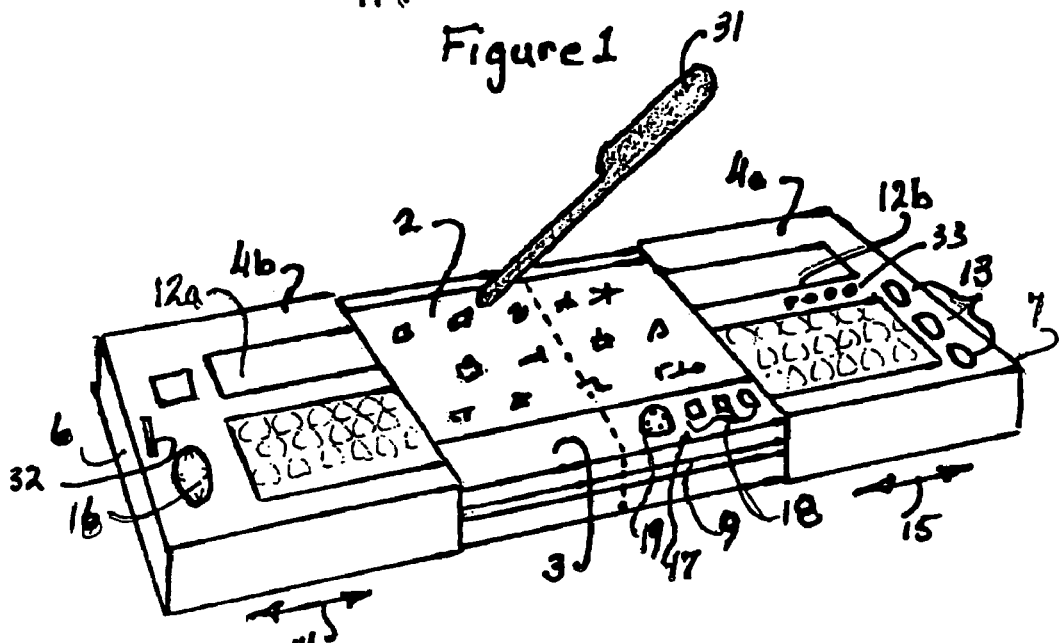
FIG. 2 is a perspective view of the multi-function device shown in FIG. 1 with the cover panel in a fully open position.

As shown in FIG. 2, device 10 is constructed with a body 1 that provides an enclosure 5 for the components of the device 10 and has a longitudinal axis y-y. A display screen 2 is mounted on the top surface 3 of body 1 and is dimensioned to maximize its size relative to surface 3. A cover module 4 is constructed in two parts 4a and 4b slidably attached to body 1. Cover parts 4a and 4b are movable, as shown by arrows 14 and 15. In a fully closed position, as shown in FIG. 1, cover parts 4a and 4b engage at transverse joint 30 to fully cover device 10. In another position, as shown in FIG. 2, cover parts 4a and 4b are separated and extend along axis y-y to a predetermined position in which the display screen 2 is completely exposed for use. Other intermediate positions of operation may be set, depending on the applications and functions provided by the device.

Figure 4:
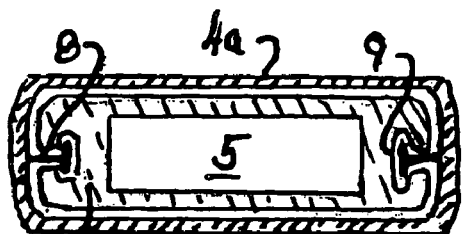
FIG. 4 is a cross sectional view of the device of FIG. 1, taken along section lines 1-1.

Cover parts 4a and 4b may be constructed as substantially mirror images in a semi-tubular shape having an inner enclosed area 5 that conforms generally to the external shape of the body 1. Each section of the inner enclosure 5 is closed at outer ends 6 and 7 to complete the protective cover 4. As shown in cross section in FIG. 4, the cover parts may be molded with internal rails 8 that engage mating slots 9 molded in the body 1.

In one embodiment, of this invention a full function keyboard 11 is constructed in two parts, i.e. in a left module 11a and right module 11b. Module 11a is mounted on cover part 4a and module 11b is mounted on cover part 4b, each for sliding movement with their respective cover parts. An electrical connection may be established at all times through the interface of rail 8 and slot 9 or by some other means, such as a flexible cable. In this way the keyboard 11 is operable in association with the display 2 and other components of the device. The keyboard modules are aligned for operation along a common axis or orientation generally parallel to the longitudinal axis y-y as the cover parts 4a and 4b moved on the body.

In a preferred embodiment of this invention, keyboard 11 is a full function text keyboard, such as a Qwerty style keyboard connected to the components of device 10 in body 1. Keyboard 11 is positioned parallel to longitudinal axis y-y of body 1 to allow the keys to be spread as widely as possible for convenient use.

In another embodiment of this invention, a transparent viewing window 12 may be constructed in the cover parts 4a and 4b, as shown in FIGS. 1 and 2. Window 12 is constructed in two sections 12a and 12b on each of the cover parts 4a and 4b. The sections of window 12 are aligned and form a continuous window when the cover parts are in the closed position. A portion of display 2 is viewable through window 12 in the closed position, thereby allowing use of the display 2 for text applications in conjunction with keyboard 11. Controller 20 controls the content and orientation of the display 2 through display driver 21.

An array of softkeys may be provided on a portion of a cover part, such as function buttons 13 on cover part 4b and browser button 16 on cover part 4a.

Body 1 is of generally rectangular shape and display 2 is mounted thereon in operating connection with the components of the device 10 contained within enclosure 5 of body 1. The display 2 is arranged on body 1 to maximize its size. As shown, it has a rectangular display area, substantially coextensive with the top surface 3 of body 1. In one embodiment of this invention, display screen 2 is a touch sensitive display adapted to provide operating functions, for example menu selection, Internet browsing, communications and other functions and may be actuated by a scribe 31.

Figure 3:
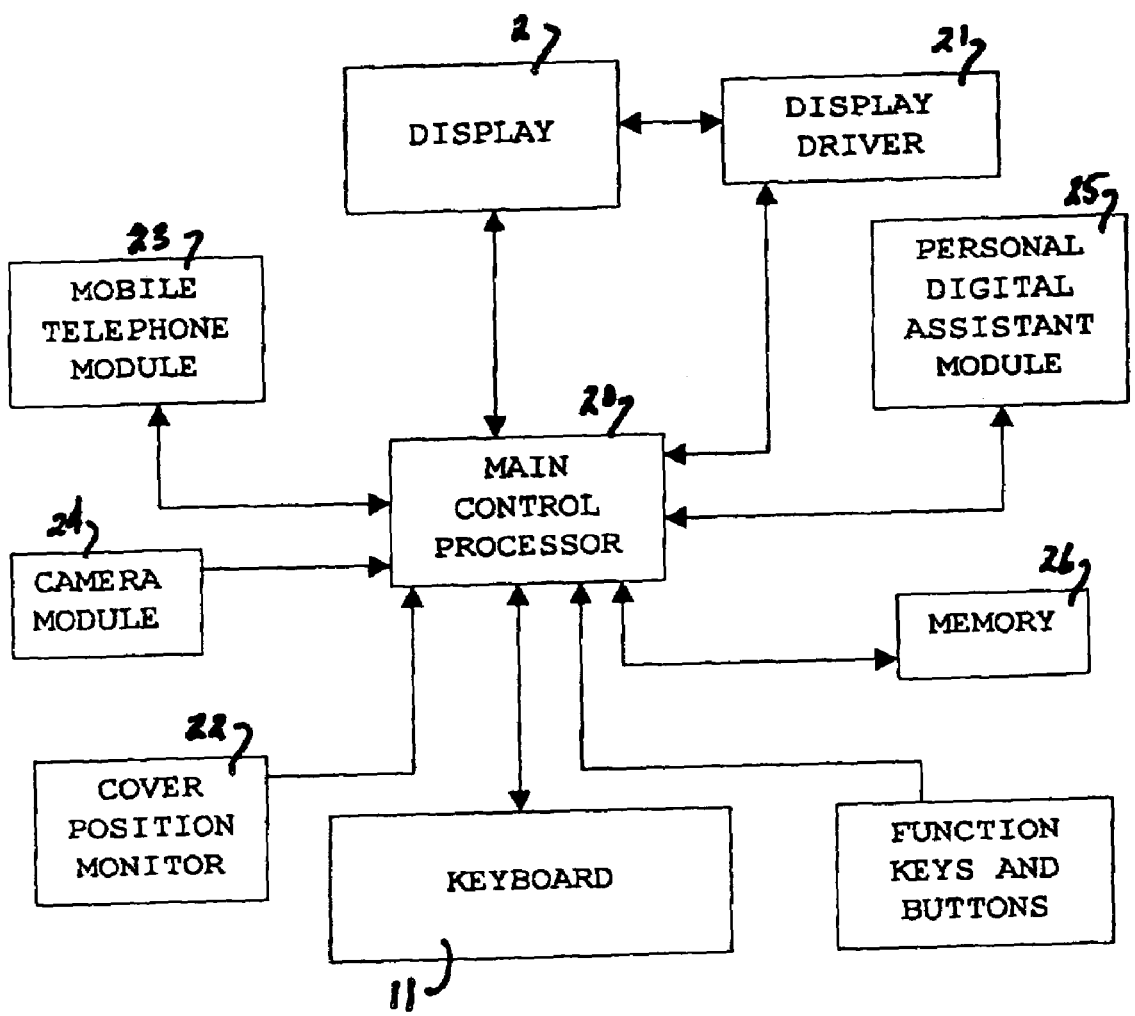
FIG. 3 is a block diagram of a PDA/cellphone according to this invention.

In another embodiment of this invention a keypad deck 17 may be constructed on top surface 3 of body 1 to allow the mounting of additional function keys 18 and browser button 19. Other components of the device 10 may also be contained on the cover 4. As shown in FIGS. 1 and 2, for example, a microphone 32 and speaker 33 may be arranged on cover part 4b and 4a respectively. In addition a camera lens 34 could also be contained on one of the cover parts such as 4a, as shown in FIGS. 1 and 2. As shown in FIG. 3, the operation of such modules are each controlled through microprocessor controller 20. In addition the functions available through operational keys and buttons 13, and 16,18-19, may be set according to the application selected by the user and by the position of the cover parts 4a and 4b through controller 20.

In operation, as shown in FIG. 3, a controller 20 coordinates the operation of the keyboard 11 with the display screen 2. A display driver 21 operatively associated with display screen 2 causes images or data to be oriented on the display screen 2 as needed by the application selected by the user, for example in parallel with the keyboard 11 and confined to the area exposed by viewing window 12 in the closed position. A cover position monitor 22 provides a signal indicative of the position of the cover to prompt the controller 20 to activate the keyboard 11 in a predetermined position, for example the closed position and, if the keyboard is not to be used, to deactivate keyboard 11 in, for example the open position, or to activate softkeys 13, and browser button 16 on the cover part 4 according to the requirement of a selected application. In an alternate embodiment, the keyboard may be arranged for use in several intermediate positions, for particular applications, such as with mobile telephone module 23 or camera module 24.

In another embodiment of the invention a PDA module 25 is operatively associated with display screen 2 and keyboard 11 through controller 20. Similarly a cellular phone module 23 operates through controller 20. A memory 26 may be provided to store data and programs for executing the various functions provided by the device 10. These components such as controller 20, display driver 21, telephone module 23, PDA module 25, memory 26, may all be enclosed within the enclosure 5 of body 1.

Figure 5:
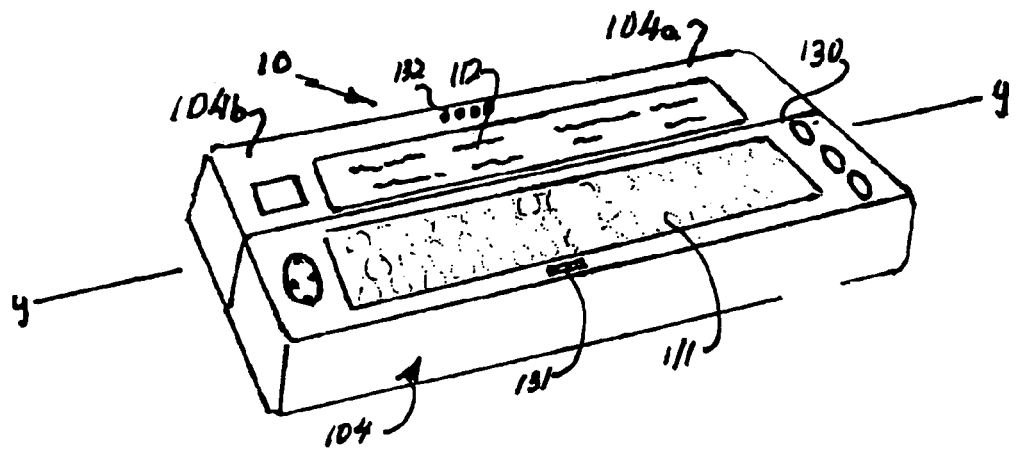
FIG. 5 is a perspective view of an alternate embodiment of a multi-function device with the cover panel in a closed position.
Figure 6:
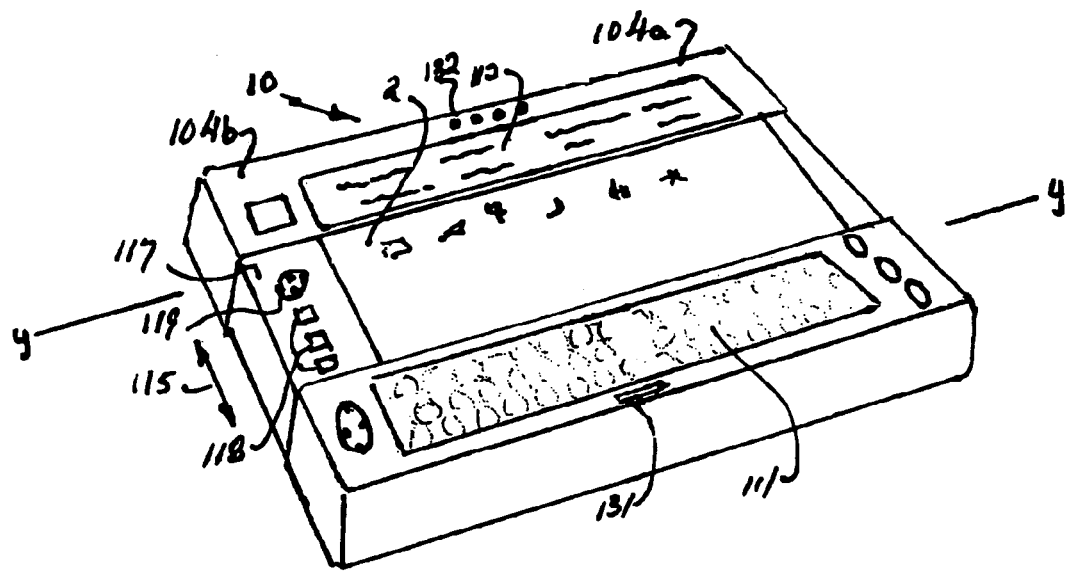
FIG. 6 is a perspective view of the multi-function device shown in FIG. 5 with the cover panel in a fully open position.

In the alternate embodiment of FIGS. 5 and 6, the cover 104 is split along joint 130 and the cover parts 104a and 104b slide transverse to the longitudinal axis y-y, as shown by arrow 115 between a full cover position, as shown in FIG. 5 and an open position as shown in FIG. 6. In this embodiment, keyboard 111 and window 112 would not be split. Other components, such as speaker 132 and microphone 131 could be arranged on cover parts 104a and 104b. Browser button 119 and softkeys 118 maybe arranged on deck 117. Controller 20 would be adapted to orient the display either longitudinally or transverse depending on the positions of the cover parts.

It should be understood that the above description is only illustrative of the invention. Various alternatives and modifications can be devised by those skilled in the art with out departing from the invention. Accordingly, the present invention is intended to embrace all such alternatives, modifications and variances which fall with the scope of the appended claims.

What is claimed is:

1. An electronic device for use in multiple applications comprising:

a body adapted to enclose a plurality of electronic components arranged within the body to provide multiple functions selectable by a user, said body having a longitudinal axis;

a display screen mounted on the body to display data and images in operational association with the plurality of electronic components;

a cover module constructed in two cover parts and mounted on the body to provide opposing sliding motions of each cover part on said body between a first position wherein the cover parts abut and cover the display and a second position in which the display is at least partly uncovered, and wherein said sliding motion is in a direction transverse to the longitudinal axis; and a keyboard mounted on the cover module in operative association with said display screen and at least some of the plurality of components, to allow the input and display of data and images.

2. An electronic device for use in multiple applications, according to claim 1, wherein the display screen is arranged to be substantially coextensive with the top surface of the body to maximize the potential area on which data and images can be displayed.

3. An electronic device for use in multiple applications, according to claim 1, wherein the display screen is touch sensitive.

4. An electronic device for use in multiple applications, according to claim 1, further comprising a controller adapted to coordinate the operation of the display with the operation of the keyboard such that the data and images displayed are oriented in parallel relation to the keyboard when the keyboard is in use.

5. An electronic device for use in multiple applications, according to claim 1, further comprising a controller adapted to coordinate the operation of the display with the movement of the cover parts.

6. An electronic device for use in multiple applications, according to claim 1, further comprising a controller adapted to coordinate the operation of the display with the movement of the cover parts and the application selected by a user.

7. An electronic device for use in multiple applications, according to claim 1, wherein one of said cover parts is constructed with a viewing window so that at least a part of the display may be viewed through said window when the cover is in the first position, and further wherein a controller is adapted to coordinate the operation of the display with the position of the cover parts, such that the data and images displayed are oriented and limited to said at least a part of the display visible through the window.

8. An electronic device for use in multiple applications, according to claim 1, wherein the keyboard comprises a full function QWERTY array of keys.

9. An electronic device for use in multiple applications, according to claim 1, wherein the sliding motion of the cover parts is transverse to said longitudinal axis and further wherein the keyboard is arranged on the cover in a parallel relation to said longitudinal axis.

* * * * *